United States Patent
Olson et al.

(10) Patent No.: US 8,416,069 B2
(45) Date of Patent: Apr. 9, 2013

(54) SYSTEMS AND METHODS FOR CONTROLLING COMMUNICATION OVER A POWER DISTRIBUTION NETWORK

(75) Inventors: Verne Jon Olson, Pequot Lakes, MN (US); James Hilmer Glende, Baxter, MN (US); Michael Lloyd Schroeder, Emily, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 832 days.

(21) Appl. No.: 12/608,124

(22) Filed: Oct. 29, 2009

(65) Prior Publication Data

US 2011/0102159 A1    May 5, 2011

(51) Int. Cl.
*G08B 1/08*    (2006.01)

(52) U.S. Cl. .......... 340/538; 340/506; 340/538.15; 340/12.31; 340/12.32; 340/12.37; 340/12.4; 340/286.02

(58) Field of Classification Search ............ 340/506, 340/538, 538.15, 12.31, 12.32, 12.37, 12.4, 340/286.02
See application file for complete search history.

(56) References Cited

U.S. PATENT DOCUMENTS

| 5,400,246 A * | 3/1995 | Wilson et al. ............... 700/17 |
| 2004/0156444 A1 | 8/2004 | Nakache et al. |

OTHER PUBLICATIONS

U.S. Appl. No. 12/608,078, Bonicatto, Damian G.

* cited by examiner

*Primary Examiner* — Daryl Pope
(74) *Attorney, Agent, or Firm* — Kilpatrick Townsend & Stockton LLP

(57) ABSTRACT

An embodiment of a communication system can control transmission of a data signal to a power distribution network based on signal data measured from the power distribution network. The signal data may represent an amount of crosstalk or an amount of noise experienced on the power distribution network. The signal data and an identification of at least one active power line coupler unit can be used to determine an adjustment to one or more power line coupler units. A control signal that represents the adjustment can be used to adjust the power line coupler units.

17 Claims, 7 Drawing Sheets

SYSTEMS AND METHODS FOR CONTROLLING COMMUNICATION OVER A POWER DISTRIBUTION NETWORK

FIELD OF THE DISCLOSURE

The present disclosure relates generally to communication over a power distribution network and, more specifically, to various systems and methods for configuring a device based on measured data from the power distribution network.

BACKGROUND

Some communication systems can be implemented with a power distribution network to provide communication between two devices over communication mediums provided by the power distribution network. For example, automated meter-reading systems can provide communication between an endpoint device and a device located at a power distribution substation or other location remote to the endpoint device. The endpoint device can include a meter-reading unit associated with a transceiver. The device can communicate with the endpoint device over power lines and other components of the power distribution network to receive meter readings and other data and to transmit requests for readings, control data, or other information. For example, the device located at the power distribution substation can include one or more power line coupler units that can transmit data signals onto the power distribution network.

Communications over a power distribution network can experience problems. Examples of problems include crosstalk between signals from two or more power line coupler units and noise present on the power distribution network. Increasing an amount of amplification by the power line coupler units to the signals may assist in overcoming the noise present on the power distribution network. However, increasing the amount of amplification may increase the crosstalk between signals from two or more power line coupler units.

Power line coupler units can be configured at installation to transmit data signals at a specified amplification amount or other characteristic to minimize crosstalk and effects from noise from the power distribution network. Environmental conditions, component deterioration, changing component characteristics, or other factors may, over time, cause or allow the crosstalk and effects from noise to affect detrimentally the data signals. A technician may reconfigure the power line coupler units after detecting a deterioration in data signal quality.

This type of reconfiguration, however, may fail to account dynamically for changes in the power distribution network. For example, the reconfiguration may be based on signal deterioration, as it is received at an endpoint device or otherwise instead of current network conditions and data signals propagating on the network. Furthermore, this type of reconfiguration may cause communication delays based on the amount of time between problem detection and reconfiguration.

Accordingly, systems and methods are desirable that can allow configuration of a communication system for operation in a power distribution network based on data about the network or data signals propagating on the network. Systems and methods may be desirable that allow configuration in near real-time operation.

SUMMARY

Certain aspects and embodiments of the present invention are directed to a communication system that can control transmission of a data signal to a power distribution network based on signal data measured from the power distribution network. The signal data may represent an amount of crosstalk or an amount of noise experienced on the power distribution network. The signal data and an identification of at least one active power line coupler unit can be used to determine an adjustment to one or more power line coupler units. A control signal that represents the adjustment can be used to adjust the power line coupler units.

In one aspect, a system is provided that includes a signal measurement device, a control device, and a control board. The signal measurement device can measure signal data from a power distribution network. The control device can be in communication with the signal measurement device. The control device can use an identification of at least one active power line coupler unit and the signal data measured by the signal measurement device to determine an adjustment to a functional characteristic of at least one active power line coupler unit. The active power line coupler unit can transmit a signal onto the power distribution network. The control board can be disposed in the at least one power line coupler unit. The control board can control the functional characteristic of the at least one power line coupler unit in response to the adjustment.

In at least one embodiment, the system includes an amplifier disposed in the at least one power line coupler unit. The functional characteristic can include an amplification amount of a data signal by the amplifier. The data signal can be amplified for transmission onto the power distribution network. The amount can be controlled by the control board based on a control signal representing the adjustment.

In at least one embodiment, the control board includes a programmable logic device, a digital-to-analog converter, a regulating pulse width modulator, and an amplifier driver. The programmable logic device can receive a control signal that represents the adjustment determined by the control device and can receive the data signal to be provided to the power distribution network. The digital-to-analog converter can convert the control signal to an analog signal. The pulse width modulator can generate a pulse width modulated signal from the analog signal. The amplifier driver can output a driver signal in response to the pulse width modulated signal. The amount of amplification of the data signal by the amplifier can be controlled by the driver signal.

In at least one embodiment, the signal measurement device is disposed in a substation processing unit and the control board is disposed in the power line coupler unit.

In at least one embodiment, the signal measurement device and the power line coupler unit are disposed in a power distribution substation in the power distribution network.

In at least one embodiment, the control device is disposed in the power distribution substation.

In at least one embodiment, the signal measurement device measures signal data from the power distribution network by transforming a substation bus voltage to a power waveform having a lower voltage than the substation bus voltage and obtaining samples as signal data from the power waveform.

In at least one embodiment, the control device can determine the adjustment to the at least one active power line coupler unit is reducing crosstalk if crosstalk in the signal data is above a threshold. The control device can determine the adjustment to the at least one active power line coupler unit is increasing signal strength of a data signal transmitted onto a power distribution network if the signal data represents a signal strength that is below a signal strength threshold.

In another aspect, signal data from a power distribution network is measured by a signal measurement device. An identification of at least one active power line coupler unit is received. The signal data and the identification of the at least one active power line coupler unit is analyzed by a control device to determine an adjustment to an amplifier in the at least one active power line coupler unit. A control signal that represents the adjustment to the amplifier in the at least one active power line coupler unit is generated. An amplification amount of the amplifier in the at least one active power line coupler unit is modified by a control board in accordance with the control signal.

In at least one embodiment, measuring signal data from the power distribution network includes transforming a substation bus voltage to a power waveform and obtaining samples as signal data from the power waveform. The substation bus voltage is related to a voltage of the power distribution network.

In at least one embodiment, the power waveform includes a voltage that is lower than the substation bus voltage.

In at least one embodiment, analyzing the signal data and the identification of the at least one active power line coupler unit to determine the adjustment to the amplifier in the at least one active power line coupler unit includes determining the adjustment to the amplifier in the at least one active power line coupler unit includes decreasing an amplification amount for the amplifier if crosstalk in the signal data is above a threshold.

In at least one embodiment, analyzing the signal data and the identification of the at least one active power line coupler unit to determine the adjustment to the amplifier in the at least one active power line coupler unit includes determining the adjustment to the amplifier in the at least one active power line coupler unit comprises increasing an amplification amount for the amplifier if the signal data represents a signal strength that is below a signal strength threshold.

In at least one embodiment, a data signal is amplified by the amplification amount as modified by the control board. The data signal is transmitted onto a power distribution network. The data signal can be recovered from the power distribution network by an endpoint device.

In another aspect, a communication system is provided that can be in communication with a power distribution network and can be disposed in a power distribution substation. The communication system includes an amplifier, a signal measurement device, and a control board. The amplifier can amplify a data signal by an amplification amount. The data signal can be transmitted onto the power distribution network. The signal measurement device can measure signal data from the power distribution network. The control board can control the amplification amount based on an adjustment to the amplification amount determined from the signal data.

In at least one embodiment, the communication system includes a control device. The control device can determine the adjustment to the amplification amount based on the signal data.

In at least one embodiment, the control board includes a programmable logic device, digital-to-analog converter, a regulating pulse width modulator, and an amplifier driver. The programmable logic device can receive a control signal representing the adjustment to the amplification amount from the signal data, receive the data signal to be provided to the power distribution network, provide the data signal to the amplifier, and provide the control signal to a digital-to-analog converter. The digital-to-analog converter can convert the control signal to an analog signal. The pulse width modulator can generate a pulse width modulated signal from the analog signal. The amplifier driver can output a driver signal in response to the pulse width modulated signal. The driver signal can be provided to the amplifier for controlling the amplification amount.

These illustrative embodiments are mentioned not to limit or define the invention, but to provide examples to aid understanding thereof. Other aspects, advantages, and features of the present invention will become apparent after review of the entire application, including the following sections: Brief Description of the Drawings, Detailed Description, and Claims.

DETAILED DESCRIPTION

Introduction

Certain aspects and embodiments of the present invention provide a communication system that can control transmission of a data signal to a power distribution network based on signal data measured from the power distribution network. The signal data may represent an amount of crosstalk, an amount of noise experienced on the power distribution network, or other relevant information. The signal data and an identification of at least one active power line coupler unit can be used to determine an adjustment to one or more power line coupler units. A control signal that represents the adjustment can be used to adjust the power line coupler units.

In one embodiment, a signal measurement device can measure signal data from a power distribution network and provide the signal data to a control device. The control device can determine an adjustment to one or more power line coupler units based on the signal data and an identification of active power line coupler units. A power line coupler unit may be a device that is capable of transmitting a signal onto a power line of a power distribution network. Examples of a power line coupler unit include a transformer coupler unit and a capacitor coupler unit. An active power line coupler unit can include a power line coupler unit that is transmitting a signal onto the power distribution network when the signal data is measured by the signal measurement device or before the signal data is measured. The control device can generate a control signal that represents the adjustment and can provide the control signal to one of more power line coupler units. A control board associated with a power line coupler unit can use the control signal to configure the power line coupler unit by adjusting one or more functional characteristics. For example, the control board may cause the power line coupler unit to increase an amount of amplification of the data signal transmitted onto the power distribution network.

In some embodiments, the adjusted power line coupler units can provide a data signal to the power distribution network that overcomes noise that may be present and avoids crosstalk.

Illustrative System Implementation

Figure 1:
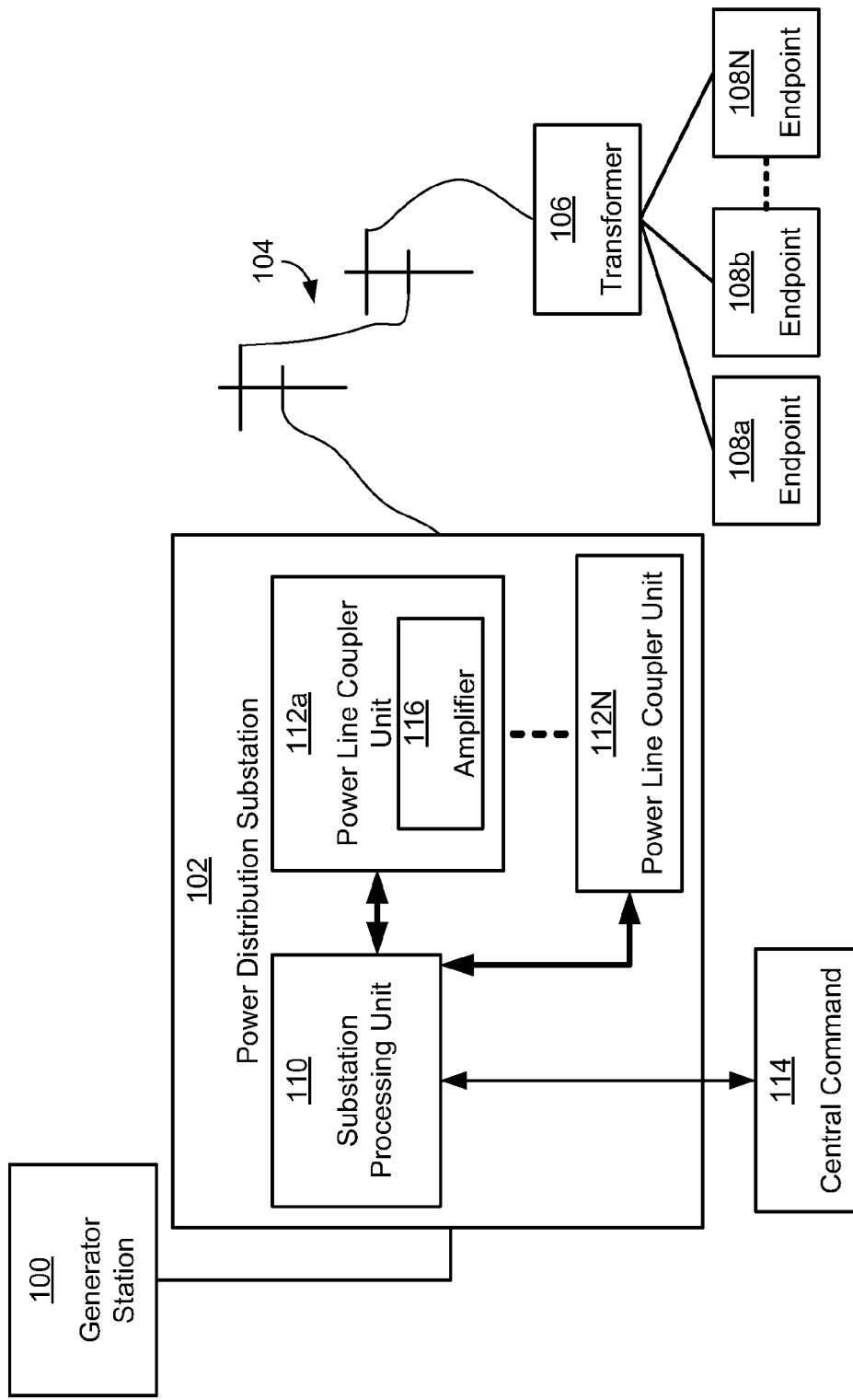
FIG. 1 is a block diagram of a communication system in a power distribution network according to one embodiment of the present invention.

FIG. 1 depicts a communication system in a power distribution network according to one embodiment of the present invention. The power distribution network includes a generator station 100 that generates power and provides it to a power distribution substation 102 over high voltage power transmission cables or otherwise. The power distribution substation 102 includes transformers (not shown) that can change the voltage level of the power from a high voltage level to a level that is suitable for distribution. The lower level power is provided through power lines 104 to a transformer 106 that lowers the voltage level to a level that is usable at consumer locations associated with endpoint devices 108a-N. Each of the endpoint devices 108a-N may include a transceiver and a meter-reading unit or other unit for gathering and providing information at a location associated with the respective endpoint device. In some embodiments, each of the endpoint devices 108a-N is associated with a household or business that is a consumer of electric power delivered by the power distribution network.

The power distribution substation 102 can include devices that are configured to communicate over the power lines 104 with each of the endpoint devices 108a-N. The devices can include a substation processing unit 110 and power line coupler units 112a-N. The substation processing unit 110 can communicate through a wireline or wireless connection with each of the power line coupler units 112a-N. In some embodiments, the substation processing unit 110 communicates with power line coupler unit 112N, for example, through power line coupler unit 112a. The substation processing unit 110 can include circuitry that is configured to collect or otherwise receive data to be provided to one or more of the endpoint devices 108a-N and can receive data through the power distribution network. Each of the power line coupler units 112 can interface with the power lines 104 through a transformer (not shown) or otherwise to provide the data to one or more of the endpoint devices 108a-N through power lines 104.

For example, the substation processing unit 110 can receive a data signal from a central command center 114 and provide the data signal to one or more of the power line coupler units 112a-N. The central command center 114 may be located remote to the power distribution substation 102. The central command center 114 can include components that may communicate with the power distribution substation 102 via a telecommunications network, such as over an Ethernet cable or wirelessly, or via the power distribution network. Each of the power line coupler units 112a-N includes an amplifier that can amplify the data signal for transmission to the power distribution network. Amplifier 116, for example, is depicted as being disposed in power line coupler unit 112a.

In some embodiments, the substation processing unit 110 includes components or circuitry that can measure signal data from the power distribution network. The signal data can be used by the central command center 114 or components in the power distribution substation 102 to determine an adjustment to one or more of the power line coupler units 112a-N. For example, the signal data may represent noise on the power distribution network that exceeds a pre-set threshold. In response to the signal data, a control signal can be provided to the power line coupler unit 112a that causes the amplifier 116 to increase an amount of amplification for the data signal. The data signal with a higher amplification can be provided to the power distribution network by the power line coupler unit 112a. The data signal with the higher amplification can overcome the noise on the power distribution network.

The data signal may be a frequency shift keying (FSK) signal having two tones with a frequency in the range of 540 Hz to 600 Hz. The control signal may be a digital signal that represents an adjustment amount, such as an amplification amount, and an address of the one or more power line coupler units to be adjusted.

Although FIG. 1 depicts the power distribution substation 102 as having one substation processing unit 110 and more than one power line coupler unit, embodiments of the present invention can be implemented using any number, from one to many, of each of the substation processing unit and the power line coupler unit. Furthermore, certain embodiments of the present invention include power distribution substations that are located remotely from each other. Each of the power distribution substations includes one or more power line coupler units. Adjustments can be determined for a power line coupler unit in a first power distribution substation to reduce undesirable conditions from affecting a power line coupler unit in a second power distribution substation.

Figure 2:
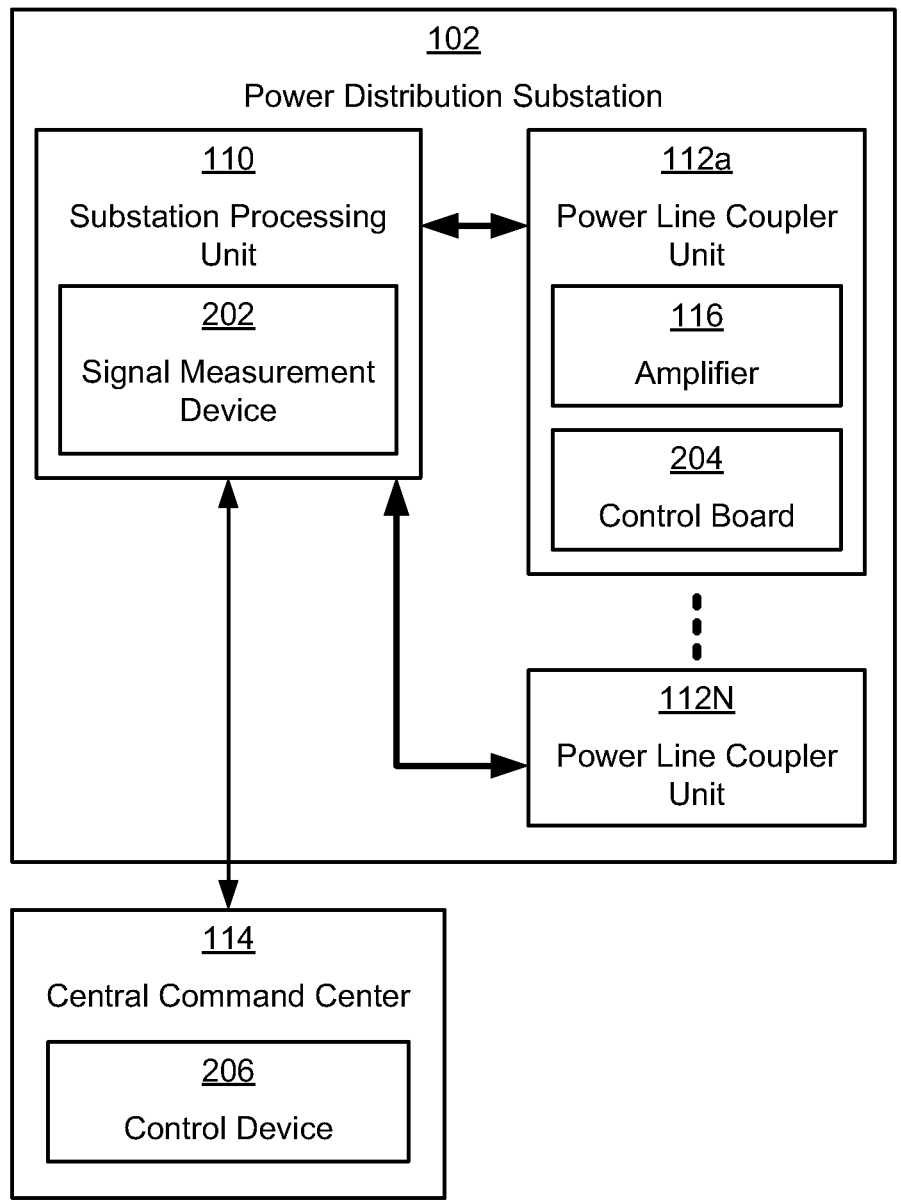
FIG. 2 is a block diagram of a control device in a central command system capable of communicating with a communication system in a power distribution substation according to one embodiment of the present invention.

FIG. 2 depicts components in or associated with the power distribution substation 102 that can control the power line coupler units 112a-N based on signal data measured from the power distribution network. The power distribution substation 102 includes a signal measurement device 202 and a control board 204. The signal measurement device 202 is disposed in the substation processing unit 110. The control board 204 is disposed in the power line coupler unit 112a. In some embodiments, each power line coupler unit of power line coupler units 112a-N can include more than one control board. For example, each power line coupler unit may include three control boards, one for each phase of power. A control device 206 is disposed in the central command center 114 that is in communication with the substation processing unit 110. Control device 206 may be hardware, software, or a combination of hardware and software that is configured to perform certain methods according to various embodiments of the present invention.

The signal measurement device 202 is capable of measuring signal data from a power distribution network. In some embodiments, the signal measurement device 202 is capable of measuring signal data from one, two, or three phases of a power waveform from the power distribution network. A power waveform can include a voltage waveform and/or a current waveform. The signal measurement device 202 may include signal processing circuitry, such as an analog to digital converter, that can sample the power waveform. The samples can be processed by a computer processing unit in the signal measurement device 202. For example, the computer processing unit may filter the samples from the power waveform and may be associated with a computer-readable medium that can store the samples, filtered or unfiltered. The computer-readable medium may be any tangible media that is configured to store data. Examples of the computer-readable medium include random access memory, read only memory, magnetic media, optical media, and flash memory.

The samples can represent signal data. For example, the samples may represent an amount of crosstalk among two or more data signals provided to the power distribution network by power line coupler units, the strength of one or more data signals, or other characteristics of the data signals and the effects of the power distribution network on the data signals.

The signal measurement device 202 can receive an identification of the active power line coupler units. Active power line coupler units can include power line coupler units that provided data signals onto the power distribution network when the samples were obtained. The samples and the identification of the active power line coupler units can be stored on the computer-readable medium until they are provided to the control device 206. In some embodiments, the signal measurement device 202 obtains samples of the power waveform continuously and provides the samples to the control device 206 periodically.

The control device 206 can receive the samples and the identification of active power line coupler units from the signal measurement device 202. The control device 206 may include a processor and an application stored on a computer-readable medium. The application can be executed by the processor to cause the control device 206 to determine an adjustment to one or more power line coupler units based on the samples that represent the signal data and based on the identification of active power line coupler units. The adjustment may be a set point associated with a functional characteristic, such as an amplification amount, of one or more power line coupler units. In some embodiments, the control device 206 is capable of displaying the samples on a user interface and, in response to a command representing an adjustment that is received through a user input device, develop a control signal that represents the adjustment.

The control device 206 can provide a control signal that represents the adjustment. The control signal can be provided to the substation processing unit 110. The substation processing unit 110 can provide the control signal and a data signal to one or more of the power line coupler units 112a-N.

In some embodiments, the control device 206 is a master controller that can determine the adjustment to one or more power line coupler units based on the samples that represent the signal data and based on the identification of one or more active power line coupler units. The master controller can output a command to a local control device disposed in the power distribution substation 102. The local control device can generate the control signal in response to the command. The local control device may be the substation processing unit 110.

The substation processing unit 110 can include a processor that can provide the control signal and a data signal to be transmitted to the power distribution network to one or more of the power line coupler units 112a-N. In some embodiments, the control signal is provided to each of the power line coupler units addressed in the control signal at least three consecutive times to avoid bit errors. For example, the transformer control unit 112a is configured to receive the control signal three consecutive times before modifying its functional characteristics based on the control signal.

The control signal can include a data packet of bits that represent the adjustment. In some embodiments, the data packet is framed by the substation processing unit 110 to avoid bit errors. For example, the data packet may be a payload that is preceded by a sync condition and that is followed by a stop condition. The sync condition may be a one or more bits that represent a start to the control signal. The stop condition may be one or more bits that represent a stop to the control signal. In some embodiments, the sync condition is eighteen consecutive bits having a value of digital "1" and the stop condition is one or more bits having a value of digital "1". The data packet may be sixteen bits that is between the sync condition and the stop condition in the digital bit stream.

In some embodiments, the substation processing unit 110 combines the control signal with a data signal to generate a composite signal. The composite signal can represent the adjustment and the data to be transmitted onto the power distribution network. The composite signal can be provided to one or more of the power line coupler units 112a-N over a fiber optic cable or other suitable medium.

The control board 204 in the power line coupler unit 112a, for example, includes circuitry that can decode the control signal from the composite signal and use the control signal to control functional characteristics of the power line coupler unit 112a when transmitting a data signal to the power distribution network.

Figure 3:
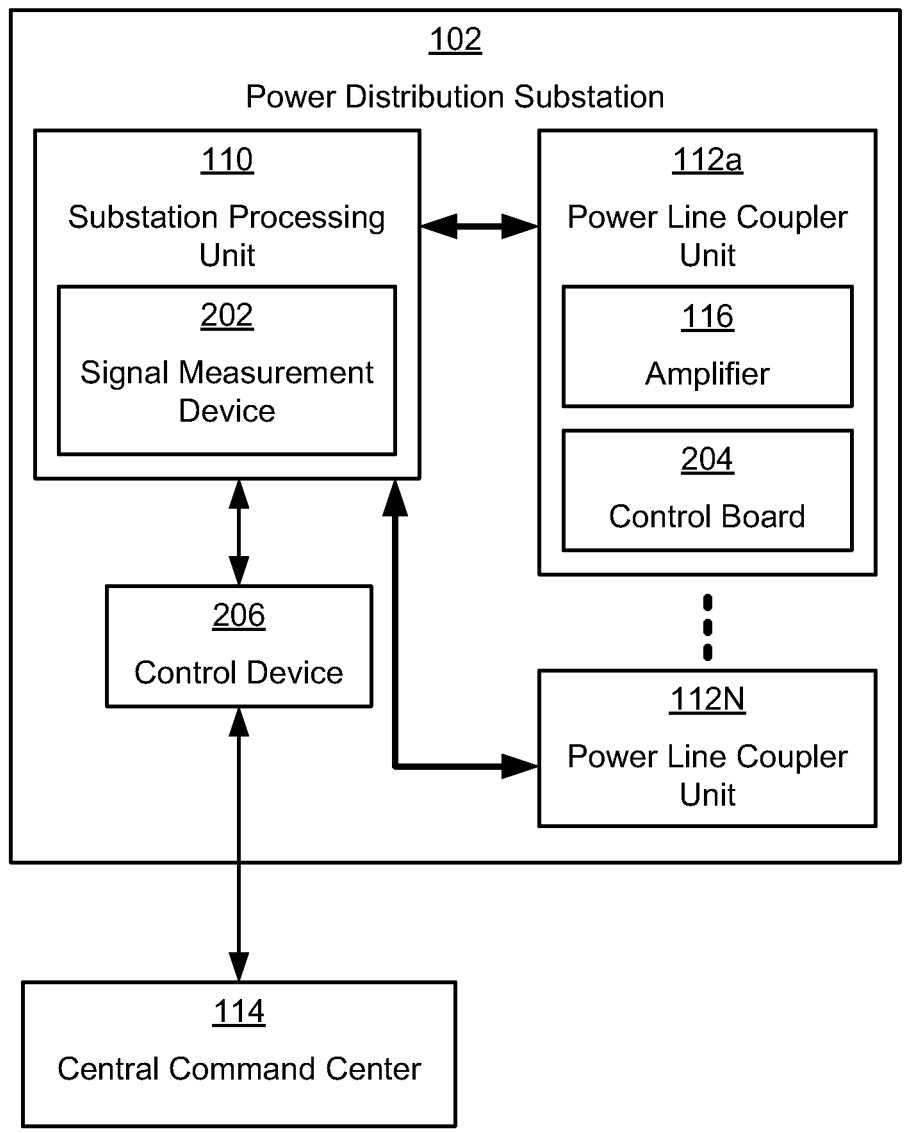
FIG. 3 is a block diagram of a control device in a power distribution substation according to a second embodiment of the present invention.

The control device 206 may be located in any component of the communication system. For example, the control device 206 may be disposed in the substation processing unit 110 or the power line coupler unit 112a. In some embodiments, the control device 206 is located in the power distribution substation 102, as depicted in FIG. 3. The control device 206 can receive samples that represent signal data and an identification of one or more active power line coupler units from the substation processing unit 110. Based on the samples and the identification, the control device 206 can determine an adjustment to functional characteristics of one or more of the power line coupler units 112a-N and can generate a control signal that represents the adjustment.

Figure 4:
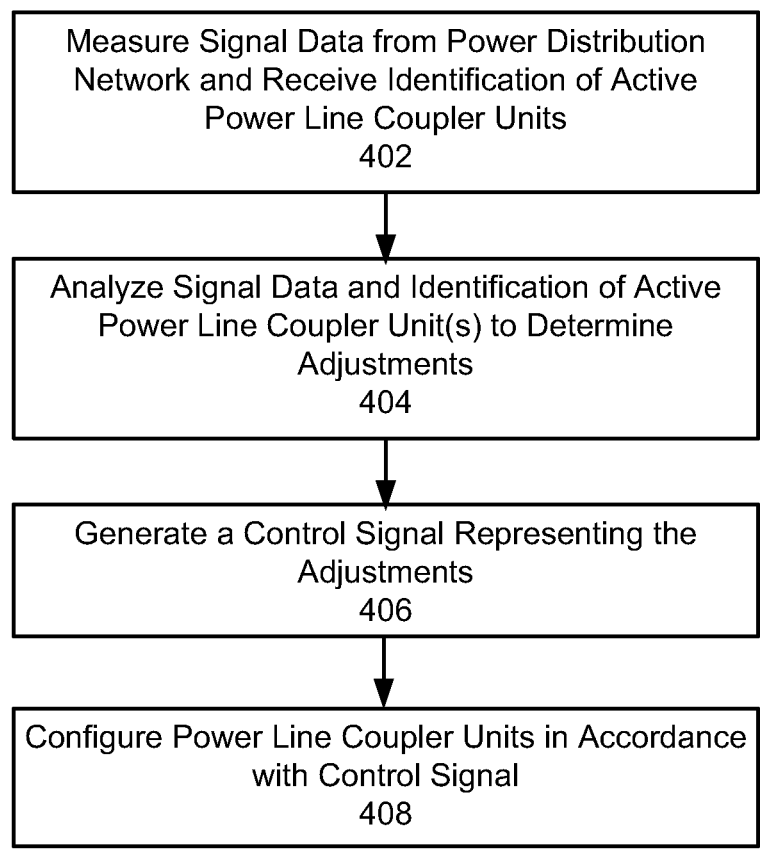
FIG. 4 is a flow diagram of a process for configuring transformer control units based on signal data measured from a power distribution network according to one embodiment of the present invention.

Illustrative Methods for Configuring Power Line Coupler Units Based on Measured Signal Data FIG. 4 illustrates an embodiment of methods for configuring one or more power line coupler units based on measured signal data. The methods shown in FIG. 4 are described with reference to the system block diagram of FIG. 2 and the flow diagrams depicted in FIGS. 5 and 6.

Figure 5:
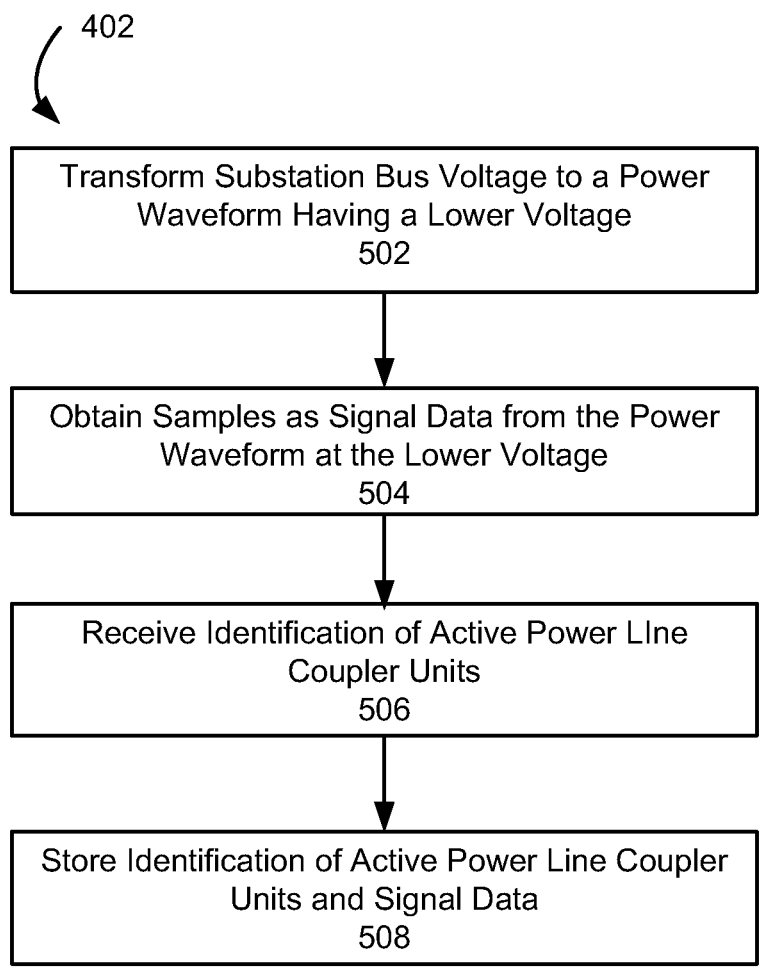
FIG. 5 is a flow diagram of a process for measuring signal data from a power distribution network according to one embodiment of the present invention.

In block 402, the substation processing unit 110 measures signal data from the power distribution network. In some embodiments, the substation processing unit 110 obtains samples of a power waveform from the power distribution network. The samples may be the signal data measured from the power distribution network. Signal data can include characteristics of the power waveform on the power distribution network and any transmitted data signals on the power distribution network. The FIG. 5 illustrates one embodiment of a substation processing unit 110 measuring signal data from a power distribution network.

In block 502, a substation bus voltage is transformed to a power waveform having a lower voltage. The substation bus voltage may be at a voltage level that is the same or lower than a high voltage power line. For example, the substation bus voltage may be in the range of 7,200 to 25,000 V, or the substation bus voltage may be a stepped down voltage of or around 120 V. The substation bus voltage may be stepped down to a lower voltage, such a 1 V. The power waveform at the lower voltage can be received by the substation processing unit 110 for analysis.

In block 504, the substation processing unit 110 obtains samples from the power waveform at the lower voltage. The samples may represent signal data about signals on the power distribution network. In some embodiments, the substation processing unit 110 includes an analog-to-digital converter that can obtain samples the power waveform that is a digital representation of the power waveform. The analog-to-digital converter may be configured to obtain samples continuously. In some embodiments, a processor, such as a digital signal processor, in the substation processing unit 110 includes a filter that can filter the samples. The samples may be filtered to, for example, obtain a more accurate estimate of signal strength from signals transmitted by a power line coupler unit in the presence of a larger power waveform on the power distribution network.

In block 506, the substation processing unit 110 receives an identification of one or more active power line coupler units. An active power line coupler unit may be a power line coupler unit that transmitted a data signal on the power distribution network when the samples were obtained from the power distribution network. The identification of one or more active power line coupler units may be received from the power line coupler units among the power line coupler units 112*a*-N that transmitted a data signal. The identification may correspond to an address that is associated with the power line coupler unit that transmitted the data signal.

In block 508, the substation processing unit 110 stores the identification of active power line coupler units and stores the samples that represent signal data. For example, the substation processing unit 110 can include a computer-readable medium on which the identification of active power line coupler units and the samples that represent signal data are tangibly stored. In some embodiments, the samples that represent signal data may be associated with the identification of active power line coupler units that transmitted a data signal when the samples were obtained by the substation processing unit 110. The identification of active power line coupler units and the samples that represent signal data may be stored until the substation processing unit 110 provides them to the control device 206.

Figure 6:
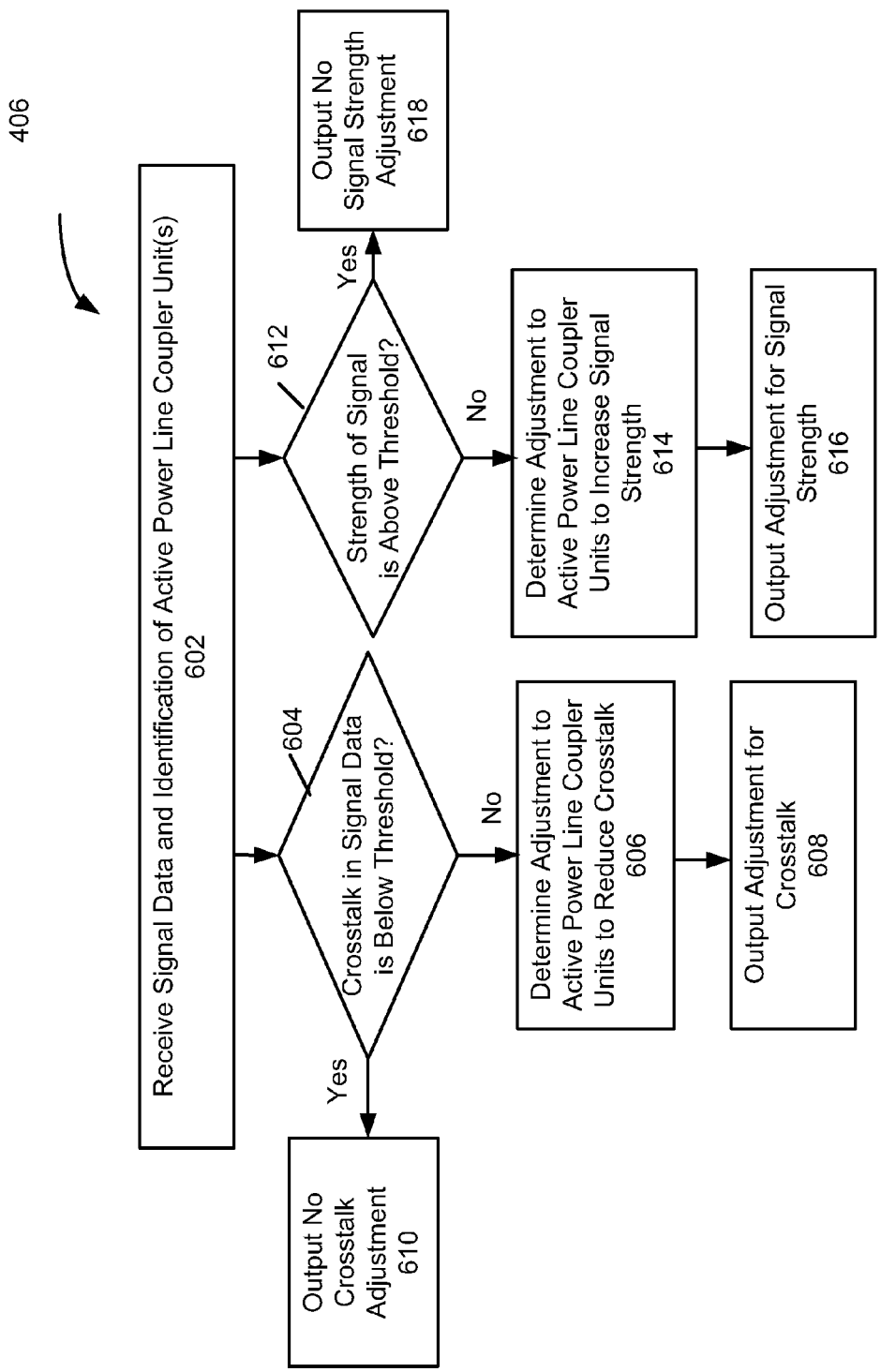
FIG. 6 is a flow diagram of a process for determining an adjustment for one or more power line coupler units according to one embodiment of the present invention.

Returning to FIG. 4, the control device 206 analyzes the signal data and the identification of active power line coupler units to determine one or more adjustments to the power line coupler units that may be needed in block 404. For example, the signal data may indicate that crosstalk between data signals is at an undesirable level or that noise on the power distribution network is at an undesirable level. The control device 206 can determine the power line coupler units that may need to be adjusted to reduce crosstalk or overcome noise and determine an amount of adjustment based on the signal data. FIG. 6 depicts one embodiment of a process for determining an adjustment for a transformer control unit.

In block 602, the control device 206 receives the signal data and the identification of active power line coupler units. The signal data and the identification of active power line coupler units may be received from the substation processing unit 110 at predetermined intervals. Examples of predetermined intervals include one minute, ten minutes, one hour, four hours, daily, or other suitable interval. The control device 206 may include a computer-readable medium on which the signal data and identification of active power line coupler units are tangibly stored. FIG. 6 depicts signal data being analyzed for crosstalk (block 604) and noise (block 612). However, any characteristic about the signal data can be analyzed and used to determine an adjustment for one or more power line coupler units.

In block 604, the control device 206 analyzes the signal data to determine whether crosstalk that may be represented by the signal data is below an acceptable threshold. An acceptable threshold may vary depending on the capabilities of the component communicating through the power distribution network, such as the capability to detect and filter data signals with crosstalk present. For example, the acceptable threshold may be higher if components in the communication system can detect and determine signals even if a large amount of crosstalk is present.

If the control device 206 determines that crosstalk represented by the signal data is not below the acceptable threshold, the control device 206 determines an adjustment to active power line coupler units to reduce crosstalk in block 606. An example of an adjustment to active power line coupler units is to reduce an amplification amount for one or more active power line coupler units to reduce crosstalk between data signals. In block 608 the control device 206 outputs the adjustment for the crosstalk as a digital bit stream representing the adjustment. In some embodiments, the digital bit stream is stored by the control device 206 until the control device 206 completes an analysis of the signal data for noise or other characteristics. The control device 206 can determine the final adjustment to the active power line coupler units based on the adjustment for crosstalk and adjustment for other characteristics, including reconciling the adjustments should they contradict.

If the control device 206 determines that crosstalk represented by the signal data is below the acceptable threshold, the control device 206 may output an indicator that represents no adjustment for crosstalk in block 610. The indicator may be a digital bit stream that represents a command for no adjustment to the active power line coupler units for crosstalk.

In block 612, the control device 206 analyzes the signal data to determine whether the strength of signals as represented by the signal data is above an acceptable threshold. The acceptable threshold may be predetermined and may vary, depending on the quality of capabilities of the components in the communication system. The signal strength may be indicative of the noise present in the power distribution network.

If the control device 206 determines that the strength of the signal is not above the acceptable threshold, the control device 206 determines an adjustment to the active power line coupler units to increase the signal strength in block 614. An example of the adjustment can include increasing an amount of data signal amplification performed by the active power line coupler units to result in a signal strength that is above the acceptable threshold.

In block 616, the control device 206 can output the adjustment for the signal strength. In some embodiments, the control device 206 may determine a total adjustment that is based on the adjustment for crosstalk and the adjustment for signal strength, or other adjustment. The control device 206 may also reconcile the adjustments should the two or more adjustments contradict. For example, the crosstalk adjustment may include lowering the data signal amplification amount performed by the active power line coupler units and the signal strength adjustment may include increasing the data signal amplification amount performed by the active power line coupler units. The control device 206 may be capable of considering both adjustments to avoid detrimentally affecting effects of noise, for example, via the crosstalk adjustment. For example, the control device 206 may average the amounts of amplification change to determine a total adjustment that seeks to minimize crosstalk and maximize signal strength to overcome power distribution network noise.

If the control device 206 determines that the signal strength represented by the signal data is above the acceptable threshold, the control device 206 may output an indicator that represents no adjustment for signal strength in block 618. The indicator may be a digital bit stream that represents a command for no adjustment to the active power line coupler units for signal strength to overcome power distribution network noise.

Determining whether crosswalk in signal data is below the threshold in block 604 and determining whether the strength of signal is above the threshold in block 612 can be performed concurrently or consecutively. Furthermore, other factors, such as a current load on the power distribution network, system performance criteria, and whether one or more endpoints have received signals successfully, can be used to determine an adjustment.

Returning to FIG. 4, the control device 206 generates a control signal that represents the adjustment in block 406. The control signal may be a digital bit stream that specifies the adjustment and the one or more power line coupler units to which to make the adjustment. For example, the control signal may include bits that represent an amplification level for an amplifier of a power line coupler unit and one or more addresses that correspond to one or more power line coupler units, respectively. The control device 206 can transmit the control signal to the substation processing unit 110.

The substation processing unit 110 can provide the control signal to the power line coupler units among power line coupler units 112a-N corresponding to the addresses in the control signal. A power line coupler unit that receives the control signal can provide it to a control board in the power line coupler unit. The control board can configure the power line coupler unit in accordance with the adjustment represented by the control signal. In some embodiments, the substation processing unit 110 can generate a composite signal that includes the control signal and one or more data signals to be transmitted by the power line coupler units. The power line coupler units that receive the composite signal can determine the control signal from the composite signal and provide the control signal to control boards in the each respective power line coupler unit.

In block 408, a control board in a power line coupler unit that receives the control signal configures the power line coupler unit in accordance with the control signal that represents the adjustment. For example, control board 204 may receive the control signal and process it to determine the adjustment to power line coupler unit 112a and change the functional characteristics of the power line coupler unit 112a in accordance with the adjustment. For example, the control board 204 may determine that the adjustment includes changing an amplification level of amplifier 116 and causes the amplification level of amplifier 116 to change in accordance with the adjustment.

Exemplary Control Board

Figure 7:
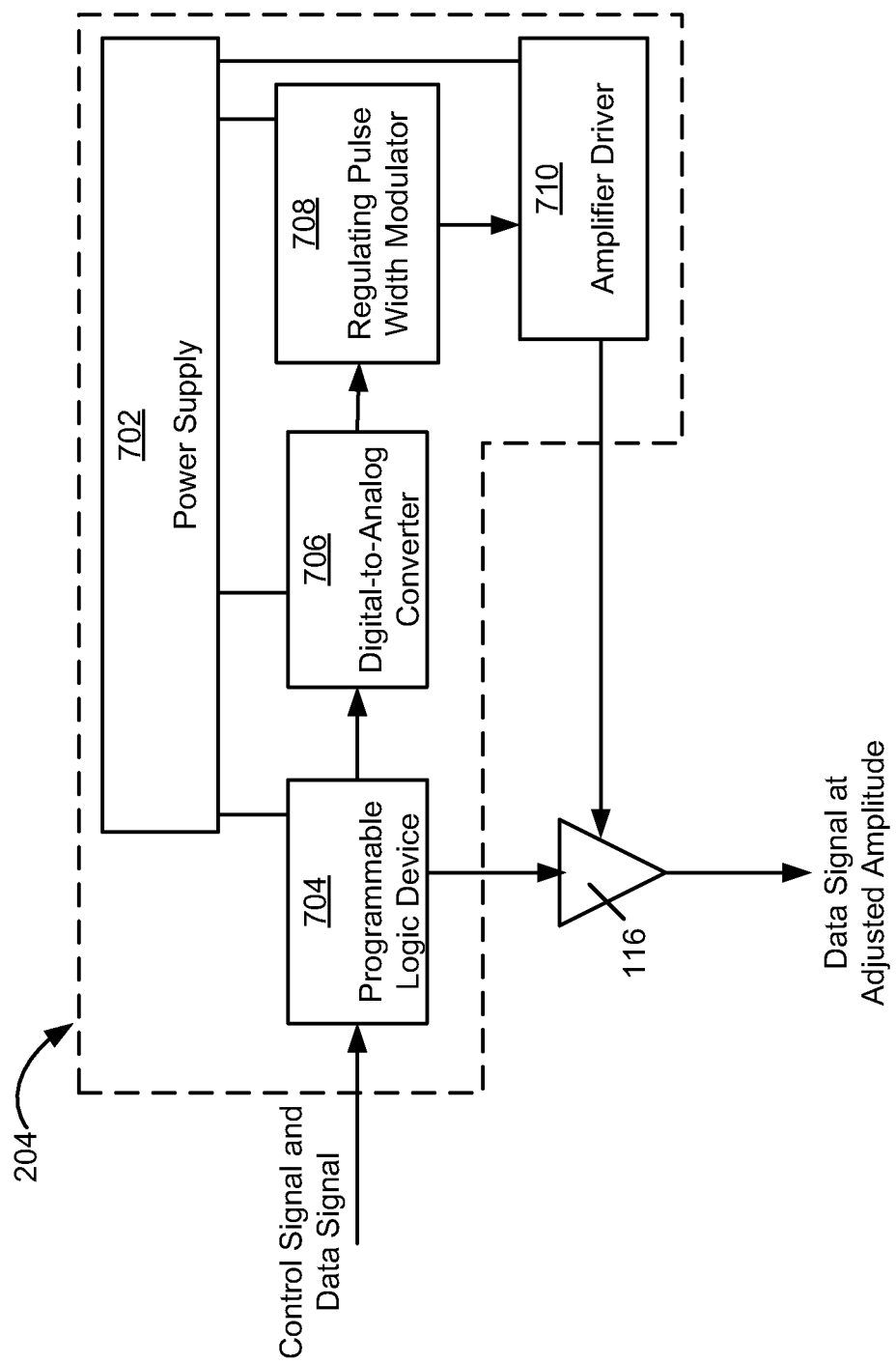
FIG. 7 depicts a control board and an amplifier according to one embodiment of the present invention.

FIG. 7 depicts a control board 204 according to one embodiment of the present invention. The control board 204 includes a power supply 702, a programmable logic device 704, a digital-to-analog converter 706, a regulating pulse width modulator 708, and an amplifier driver 710.

The power supply 702 can provide direct current (DC) power to the components of the control board. In some embodiments, the power supply 702 receives a DC voltage in a range of five to thirty volts and includes components for providing a DC voltage at different voltage levels for different control board components. The power supply 702 may include a power amplifier (not shown) having a gain of ⅕ for providing power to the digital-to-analog converter 706. The power supply 702 can include a buck/boost controller (not shown) that converts the DC voltage to 12 VDC. An example of a buck/boost controller is LTC3780 provided by Linear Technology Corp. of Milpitas, Calif.

The output of the buck/boost controller can be provided to the amplifier driver 710, to the regulating pulse width modulator 708, and to a 3.3 V switching power supply (not shown) that generates 3.3 V output power for the programmable logic device 704 and digital-to-analog converter 706. An example of the 3.3 V switching power supply is LM22671 provided by National Semiconductor of Santa Clara, Calif.

The programmable logic device 704 can receive the control signal and the data signal from a substation processing unit. For example, the programmable logic device 704 can receive a composite signal that includes the control signal and the data signal and can separate the control signal from the data signal in the composite signal. The programmable logic device 704 can provide the data signal to the amplifier 116 and can provide the control signal to the digital-to-analog converter 706. An example of the programmable logic device 704 is a complex programmable logic device such as MAX3000A provided by Altera Corp. of San Jose, Calif. In some embodiments, diagnostic light emitting diodes (not shown) may be in communication with the programmable logic device 704 to provide diagnostic and troubleshooting information. Address switches (not shown) may be associated with the programmable logic device 704 that can be configured to set an address for the control board 204 in the power line coupler unit 112a.

The programmable logic device 704 may be coupled to the digital-to-analog converter 706 by an eight-bit parallel interface. The digital-to-analog converter 706 can convert the digital control signal to an analog signal that represents one or more set points associated with the adjustment. The analog signal can be provided to the regulating pulse width modulator 708. In some embodiments, the analog signal is amplified by an amplifier (not shown) having a specified gain, for example a gain of 5.02. An example of the digital-to-analog converter 706 is AD5330 provided by Analog Devices Inc. of Norwood, Mass.

The regulating pulse width modulator 708 can change the analog signal to a pulse width modulated signal for use by the amplifier driver 710 to output a driver signal for driving the amplifier 116. An example of the regulating pulse width modulator 708 is LM3524 provided by National Semiconductor of Santa Clara, Calif.

The amplifier driver 710 can include a half-bridge driver (not shown) and a low side driver (not shown), each capable of providing a driver signal for driving the amplifier 116 in response to the pulse width modulated signal. An example of the half-bridge driver includes LT1158 provided by Linear Technology Corp. of Milpitas, Calif. An example of the lowside driver includes MIC4426 provided by Micrel Inc. of San Jose, Calif.

The amplifier 116 can amplify the data signal from the programmable logic device 704 based on the driver signal from the amplifier driver 710. In some embodiments, the amplifier 116 includes one or more field effect transistors (FET) capable of amplifying the data signal an amount that is based on the driver signal from the amplifier driver 710.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application to enable others skilled in the art to utilize the invention and various embodiments and with various modifications as are suited to the particular use contemplated. Alternative embodiments will become apparent to those skilled in the art to which the present invention pertains without departing from its spirit and scope.

What is claimed is:

1. A system comprising:
    a signal measurement device capable of measuring signal data from a power distribution network;
    a control device in communication with the signal measurement device, the control device being capable of using an identification of at least one active power line coupler unit and the signal data measured by the signal measurement device to determine an adjustment to a functional characteristic of the at least one active power line coupler unit, the at least one active power line coupler unit being configured to transmit a signal onto the power distribution network;
    a control board disposed in the at least one active power line coupler unit, the control board being capable of controlling the functional characteristic of the at least one active power line coupler unit in response to the adjustment; and
    an amplifier disposed in the at least one active power line coupler unit, the functional characteristic comprising an amount by which the amplifier is configured to amplify a data signal, the data signal being amplified for transmission onto the power distribution network, the amount being controllable by the control board based on a control signal representing the adjustment.

2. The system of claim 1, wherein the control board comprises:
    a programmable logic device configured to receive the control signal representing the adjustment to the functional characteristic as determined by the control device and to receive the data signal to be provided to the power distribution network;
    a digital-to-analog converter in communication with the programmable logic device, the digital-to-analog converter being configured to convert the control signal to an analog signal;
    a regulating pulse width modulator in communication with the digital-to-analog converter, the regulating pulse width modulator being configured to generate a pulse width modulated signal from the analog signal; and
    an amplifier driver in communication with the regulating pulse width modulator, the amplifier driver being configured to output a driver signal in response to the pulse width modulated signal,
    wherein the amplifier is in communication with the programmable logic device and the amplifier driver,
    wherein the amount of amplification of the data signal by the amplifier is controllable by the driver signal.

3. The system of claim 1, wherein the signal measurement device is disposed in a substation processing unit,
    wherein the control board is disposed in the at least one active power line coupler unit.

4. The system of claim 3, wherein the signal measurement device and the at least one power line coupler unit are disposed in a power distribution substation in the power distribution network.

5. The system of claim 4, wherein the control device is disposed in the power distribution substation.

6. The system of claim 1, wherein the signal measurement device is capable of measuring signal data from the power distribution network by:
    transforming a substation bus voltage to a power waveform having a lower voltage than the substation bus voltage; and
    obtaining samples as signal data from the power waveform.

7. The system of claim 1, wherein the control device is capable of using an identification of at least one active power line coupler unit and the signal data measured by the signal measurement device to determine an adjustment to the at least one active power line coupler unit by at least one of:
    determining the adjustment to the functional characteristic of the at least one active power line coupler unit comprises reducing crosstalk if crosstalk in the signal data is above a threshold; or
    determining the adjustment to the functional characteristic of the at least one active power line coupler unit comprises increasing signal strength of the data signal transmitted onto a power distribution network if the signal data represents a signal strength that is below a signal strength threshold.

8. A method comprising:
    measuring, by a signal measurement device, signal data from a power distribution network, wherein measuring, by the signal measurement device, signal data from the power distribution network comprises:
        transforming a substation bus voltage to a power waveform, the substation bus voltage being related to a voltage of the power distribution network; and
        obtaining samples as signal data from the power waveform;
    receiving an identification of at least one active power line coupler unit, the at least one active power line coupler unit transmitting a signal onto the power distribution network;
    analyzing, by a control device, the signal data and the identification of the at least one active power line coupler unit to determine an adjustment to an amount of amplification of a data signal by an amplifier in the at least one active power line coupler unit;
    generating a control signal representing the adjustment to the amount of amplification by the amplifier in the at least one active power line coupler unit; and
    modifying, by a control board, an amplification amount of the amplifier in the at least one active power line coupler unit in accordance with the control signal.

9. The method of claim 8, wherein the power waveform comprises a voltage that is lower than the substation bus voltage.

10. The method of claim 8, wherein analyzing, by the control device, the signal data and the identification of the at least one active power line coupler unit to determine the adjustment to the amplifier in the at least one active power line coupler unit comprises:
    determining the adjustment to the amplifier in the at least one active power line coupler unit comprises decreasing an amplification amount for the amplifier if crosstalk in the signal data is above a threshold.

11. The method of claim 8, wherein analyzing, by the control device, the signal data and the identification of the at least one active power line coupler unit to determine the adjustment to the amplifier in the at least one active power line coupler unit comprises:
    determining the adjustment to the amplifier in the at least one active power line coupler unit comprises increasing an amplification amount for the amplifier if the signal data represents a signal strength that is below a signal strength threshold.

12. The method of claim 8, wherein modifying, by the control board, the amplification amount of the amplifier in the at least one active power line coupler unit in accordance with the control signal comprises:
    converting the control signal to an analog signal;
    generating a pulse width modulated signal based on the analog signal;

providing an amplifier driver signal in response to the pulse width modulated signal; and using the amplifier driver signal to modify the amplification amount of the amplifier.

13. The method of claim 8, further comprising:

amplifying a data signal by the amplification amount as modified by the control board; and transmitting the data signal onto the power distribution network, the data signal being capable of being recovered from the power distribution network by an endpoint device.

14. A communication system capable of being in communication with a power distribution network and of being disposed in a power distribution substation, the communication system comprising:

an amplifier configured to amplify a data signal by an amplification amount, the data signal being configured to be transmitted onto the power distribution network;

a signal measurement device configured to measure signal data from the power distribution network;

a control board in communication with the amplifier, the control board being configured to control the amplification amount based on an adjustment to the amplification amount determined from the signal data; and a control device in communication with the signal measurement device, the control device being configured to determine the adjustment to the amplification amount based on the signal data.

15. The communication system of claim 14, wherein the control device is configured to determine the adjustment to the amplification amount based on the signal data by at least one of:

determining the adjustment to the amplification amount comprises decreasing the amplification amount if crosstalk in the signal data is above a threshold; and determining the adjustment to the amplification amount comprises increasing the amplification amount if the signal data represents a signal strength that is below a signal strength threshold.

16. The communication system of claim 14, wherein the control board comprises:

a programmable logic device in communication with the amplifier, the programmable logic device being configured to:

receive a control signal representing the adjustment to the amplification amount from the signal data;

receive the data signal to be provided to the power distribution network;

provide the data signal to the amplifier; and provide the control signal to a digital-to-analog converter;

the digital-to-analog converter in communication with the programmable logic device, the digital-to-analog converter being configured to convert the control signal to an analog signal;

a regulating pulse width modulator in communication with the digital-to-analog converter, the regulating pulse width modulator being configured to generate a pulse width modulated signal from the analog signal; and an amplifier driver in communication with the regulating pulse width modulator and the amplifier, the amplifier driver being configured to output a driver signal in response to the pulse width modulated signal, the driver signal being provided to the amplifier for controlling the amplification amount.

17. The communication system of claim 14, wherein the signal measurement device is configured to measure signal data from the power distribution network by:

transforming a substation bus voltage to a power waveform, the substation bus voltage being related to a voltage of the power distribution network; and obtaining samples as signal data from the power waveform.

* * * * *